US009711018B2

(12) United States Patent
Messiou et al.

(10) Patent No.: US 9,711,018 B2
(45) Date of Patent: Jul. 18, 2017

(54) PASSIVE INFRA RED DETECTOR

(75) Inventors: Antoine Yvon Messiou, Leicester (GB); Merlin Milner, Greater London (GB); Paul Mans, Greater London (GB)

(73) Assignee: Legrand Electric Limited, Birmingham (GB)

(*) Notice: Subject to any disclaimer, the term of this patent is extended or adjusted under 35 U.S.C. 154(b) by 0 days.

(21) Appl. No.: 14/112,947

(22) PCT Filed: Apr. 20, 2012

(86) PCT No.: PCT/GB2012/050879
§ 371 (c)(1),
(2), (4) Date: Jan. 6, 2014

(87) PCT Pub. No.: WO2012/143729
PCT Pub. Date: Oct. 26, 2012

(65) Prior Publication Data
US 2014/0103214 A1 Apr. 17, 2014

(30) Foreign Application Priority Data
Apr. 21, 2011 (GB) .................................. 1106821.0

(51) Int. Cl.
*G08B 13/193* (2006.01)
*G01J 1/04* (2006.01)
*G02B 13/14* (2006.01)

(52) U.S. Cl.
CPC .......... *G08B 13/193* (2013.01); *G01J 1/0411* (2013.01); *G02B 13/14* (2013.01)

(58) Field of Classification Search
CPC ......... G01J 1/0411; G02B 13/14; G08B 3/10; G08B 13/19641; G08B 13/19695;
(Continued)

(56) References Cited

U.S. PATENT DOCUMENTS 4,672,206 A * 6/1987 Suzuki ................ G08B 13/193
250/342
4,703,171 A * 10/1987 Kahl ...................... G08B 13/19
250/221
(Continued)

FOREIGN PATENT DOCUMENTS

CN 2445388 Y 8/2001
DE 4403891 A1 * 8/1995 ............... G01V 8/00
(Continued)

OTHER PUBLICATIONS

International Search Report for corresponding patent application No. PCT/GB2012/050879 dated Jun. 28, 2012.
(Continued)

*Primary Examiner* — Mark R Gaworecki
(74) *Attorney, Agent, or Firm* — Renner, Otto, Boisselle & Sklar, LLP

(57) ABSTRACT

A passive infra red detector comprises a plurality of passive infra red sensors (4, 5) and a lens member (2) arranged to direct radiation from a target area onto the sensors. The lens member (2) forms a substantially hemispherical dome about the infra red sensors (4, 5). The dome has a central axis and a plurality of contiguous facets (2a-2g) distributed about the central axis. Each facet has a flat outer surface and an inner surface that forms a lens to direct radiation onto the sensors. The detector further comprises a first passive infra red sensor (4) aligned with the central axis of the dome and having a sensitive surface substantially normal to the central axis, and a plurality of second passive infra red sensors (5) distributed about the central axis of the dome. The second passive infra red sensors (5) are inclined such that the outward normal from the sensitive surface of each second passive infra red sensor (5) makes an acute angle with the outward direction of the central axis. The detector is capable
(Continued)

of detecting movement of people within a wide region from a significant height above that region.

20 Claims, 8 Drawing Sheets

(58) Field of Classification Search
CPC ...... G08B 17/10; G08B 17/117; G08B 21/12; G08B 21/14; G08B 21/18; G08B 21/182; G08B 25/008; G08B 29/185; G08B 5/22; G08B 5/36; G08B 13/193; Y10S 250/01
USPC .......................................................... 250/349
See application file for complete search history.

(56) References Cited

U.S. PATENT DOCUMENTS

| | | | | |
|---|---|---|---|---|
| 4,757,204 A * | 7/1988 | Baldwin | ............... | G08B 13/193 250/342 |
| 4,772,797 A * | 9/1988 | Kahl | ............... | G08B 13/193 250/342 |
| 5,017,783 A * | 5/1991 | Mousavi | ............... | G01J 5/0022 250/342 |
| 5,107,120 A | 4/1992 | Tom | | |
| 5,134,292 A * | 7/1992 | Segawa | ............... | G08B 13/193 250/342 |
| 5,187,360 A * | 2/1993 | Pasco | ............... | G02B 3/0056 250/208.2 |
| 5,221,919 A * | 6/1993 | Hermans | ............... | G08B 13/193 250/342 |
| 5,308,985 A * | 5/1994 | Lee | ............... | G08B 13/193 250/342 |
| 5,311,024 A * | 5/1994 | Marman | ............... | G08B 13/193 250/342 |
| 5,406,083 A * | 4/1995 | Sandell | ............... | G08B 13/193 250/342 |
| 5,491,467 A * | 2/1996 | Tracy | ............... | G08B 13/2494 340/522 |
| 5,557,106 A * | 9/1996 | Ioco | ............... | G01J 5/08 250/353 |
| 5,677,529 A * | 10/1997 | Hofmann | ............... | G01J 1/04 250/221 |
| 5,724,168 A * | 3/1998 | Oschmann | ............... | H03F 3/087 398/127 |
| 5,757,004 A | 5/1998 | Sandell et al. | | |
| 5,864,381 A * | 1/1999 | Neal | ............... | G01J 9/00 351/200 |
| 5,886,821 A * | 3/1999 | Sohn | ............... | G01J 5/0022 250/338.3 |
| 6,037,594 A * | 3/2000 | Claytor | ............... | G01J 5/0022 250/353 |
| 6,051,836 A * | 4/2000 | Kirihata | ............... | G02B 3/0043 250/342 |
| 6,222,191 B1 * | 4/2001 | Myron | ............... | G08B 13/193 250/340 |
| 7,115,871 B1 * | 10/2006 | Tracy | ............... | G08B 13/193 250/342 |
| 7,504,633 B2 * | 3/2009 | Zhevelev | ............... | G01J 5/08 250/336.1 |
| 8,138,478 B2 * | 3/2012 | Zhevelev | ............... | G01J 5/08 250/342 |
| 2004/0041914 A1 * | 3/2004 | Peters, III | ............... | G01C 11/025 348/207.99 |
| 2006/0256452 A1 * | 11/2006 | Lung | ............... | G08B 13/193 359/742 |
| 2006/0266944 A1 * | 11/2006 | Chi | ............... | G08B 13/193 250/353 |
| 2008/0272281 A1 * | 11/2008 | Stromberg | ............... | G08B 13/189 250/216 |
| 2008/0291280 A1 * | 11/2008 | Peters, III | ............... | G01C 11/025 348/159 |
| 2010/0116266 A1 * | 5/2010 | Lovato | ............... | F24J 2/06 126/700 |
| 2011/0221908 A1 * | 9/2011 | Hoelter | ............... | B29C 43/36 348/164 |

FOREIGN PATENT DOCUMENTS

| | | | | |
|---|---|---|---|---|
| DE | 4414078 A1 * | 10/1995 | ........... | G08B 13/193 |
| EP | 0666551 | 8/1995 | | |
| EP | 100 49 543 A1 | 4/2002 | | |

OTHER PUBLICATIONS

Office Action for corresponding Chinese Patent Application No. 201280018345.9 dated Jan. 4, 2015.
Examination Report for corresponding European Patent Application No. 12717461.3 dated Feb. 23, 2016.

* cited by examiner

PASSIVE INFRA RED DETECTOR

This application is a national phase of International Application No. PCT/GB2012/050879 filed Apr. 20, 2012 and published in the English language.

This invention relates to a passive infra red detector.

BACKGROUND

Passive infra red detectors are known for providing presence and absence detection to control, for example, lighting. However, in some circumstances current designs of passive infra red detector are ineffective, particularly where the detector is a relatively large distance from the detection field. For example, in large warehouses, the height of the warehouse may be well in excess of ten meters. It is desirable to detect the presence of a worker, for example in a particular stock bay, in order to turn on lighting when the worker is present and to turn off the lighting when the worker exits. In this way, it is not necessary for the lighting to be on in every bay of a warehouse all the time and energy is saved. However, where the bay is high and the detector is mounted in the ceiling or roof of the warehouse the distance to the detector from the floor of the warehouse is very large. Current detector designs are incapable of accurately detecting presence and absence of personnel in such circumstances.

BRIEF SUMMARY OF THE DISCLOSURE

In accordance with the present invention there is provided a passive infra red detector comprising at least one passive infra red sensor and a lens member arranged to direct radiation from a target area onto the sensor(s). The lens member forms a substantially hemispherical dome about the infra red sensor. The dome has a central axis and comprises a plurality of contiguous facets distributed about the central axis. Each facet has a flat outer surface and an inner surface that forms a lens to direct radiation onto the sensor(s).

Thus, in accordance with the present invention, the flat outer surface of the facets improves energy collection compared to existing curved lens designs. Furthermore the substantially hemispherical dome provides energy collection from a wide range of directions.

The term "substantially hemispherical" as used herein is intended to cover the situation in which the dome is truly hemispherical in the sense that a cross-section of the dome that includes the central axis in the cross-sectional plane resembles a semicircle. However, the term is also intended to cover a dome that is not a complete hemisphere. For example, the dome, rather than being half a sphere, could be provided by anything up to a quarter of a sphere, i.e. a dome defined by a spherical surface and a plane intersecting the surface at a minimum of distance from the surface of between one quarter and one half of the diameter of the sphere. Moreover, the surface of the dome need not be truly spherical but may in some circumstances by elliptical, for example. Of course, the flat surfaces of the facets mean that the surface of the dome only approximates to a spherical surface.

In a preferred arrangement, the detector comprises a first passive infra red sensor aligned with the central axis of the dome. Typically, the passive infra red detector has a sensitive surface substantially normal to the central axis. Advantageously, the detector may further comprise a plurality of second passive infra red sensors distributed about the central axis of the dome. The second passive infra red sensors may be inclined such that the outward normal from the sensitive surface of each second passive infra red sensor makes an acute angle with the outward direction of the central axis. This arrangement has the advantage that the second passive infra red sensors are able to receive radiation from a range of directions without obstructing the field of detection of the first passive infra red sensor. In this arrangement, the second passive infra red sensors face towards the central axis. However, embodiments of the invention are feasible in which the second passive infra red sensors face away from the central axis, although this is not presently preferred. In this case, the second passive infra red sensors may be inclined such that the inward normal from the sensitive surface of each second passive infra red sensor makes an acute angle with the inward direction of the central axis.

This is in itself is believed to be novel and thus viewed from a further aspect the invention provides a passive infra red detector comprising a plurality of passive infra red sensors and a lens member arranged to direct radiation from a target area onto the sensors. The lens member forms a substantially hemispherical dome about the infra red sensors. The dome has a central axis and comprises a plurality of contiguous facets distributed about the central axis. Each facet has an outer surface and an inner surface that forms a lens to direct radiation onto the sensors. The detector comprises a first passive infra red sensor aligned with the central axis of the dome and having a sensitive surface substantially normal to the central axis, and a plurality of second passive infra red sensors distributed about the central axis of the dome. The second passive infra red sensors are inclined such that the outward normal from the sensitive surface of each second passive infra red sensor makes an acute angle with the outward direction of the central axis.

The acute angle between the outward normal from the sensitive surface of each second passive infra red sensor and the outward direction of the central axis may be greater than 20 degrees, preferably greater than 30 degrees. The angle may be less than 80 degrees, preferably less than 60 degrees.

In this arrangement, at least three second passive infra red sensors may be provided. In the presently preferred arrangement at least four second passive infra red sensors are provided.

The detector may be configured to generate a positive detection signal only when infra red radiation is detected by more than one of the passive infra red sensors. This has the advantage of reducing the likelihood of false positive detection signals. Thus, the detector may comprise electronic logic arranged to process signals from the passive infra red sensors and to generate a detection signal.

The dome may comprise facets which do not have a lens surface. In the preferred arrangement, however, the dome is formed exclusively from the plurality of contiguous facets having a flat outer surface and an inner surface that forms a lens to direct radiation onto the sensor(s). In this way, the maximum radiation energy is collected and concentrated onto the sensor(s).

In one arrangement, the plurality of contiguous facets comprises a plurality of arrays of facets distributed about the central axis. Each array may comprise a series of contiguous facets extending from the central axis to the base of the dome. The dome may comprise at least eight, preferably at least twelve of said arrays. Within each array the optical centres of the lenses may be aligned at the same azimuthal position about the central axis. Each array may comprise at least three facets, preferably at least four facets, more preferably at least five facets, most preferably at least six facets.

The first facets of each array may form a substantially circular lens about the central axis. Intermediate facets may be provided between the facets of the arrays to complete the surface of the dome.

In embodiments of the invention, the facets are polygonal. The dome may comprise facets that are triangular, trapezoidal, pentagonal and/or hexagonal.

Preferably, the relative areas of the facets are configured such that each lens collects substantially the same energy from a remote planar radiation source normal to the central axis. In this way, the response of the sensors is consistent to radiation from across the whole field of detection.

In general, the lenses are Fresnel lenses. The Fresnel profile of the lenses may be circular. In one embodiment, at least one of the lenses has a Fresnel profile having a first region that optimises energy collection of on-axis rays and a second region that optimises energy collection of off-axis rays.

The invention extends to a lens member for a passive infra red detector according to the invention.

BRIEF DESCRIPTION OF THE DRAWINGS

Embodiments of the invention are further described hereinafter with reference to the accompanying drawings, in which.

DETAILED DESCRIPTION

Figure 1:
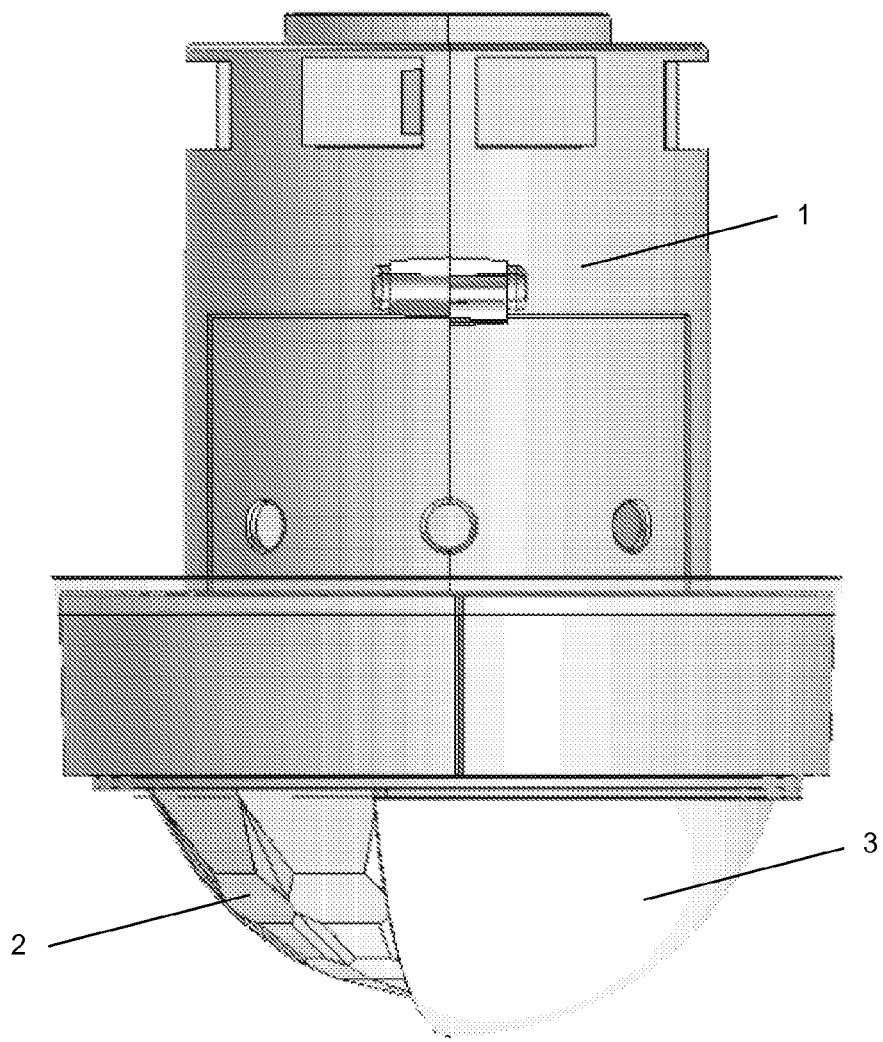
FIG. 1 is a side view of a detector according to an embodiment of the invention.

FIG. 1 is a side view of an infra red presence/absence detector according to an embodiment of the invention. As shown in FIG. 1, the detector comprises a cylindrical plastics housing 1, which is configured for mounting in a hole in a surface, in particular a ceiling. The detector further comprises a substantially hemispherical lens 2 which will be described in further detail below. In FIG. 1, the lens 2 is partially covered by a removable shield 3, which can be rotated relative to the housing 1 in order to restrict the field of detection of the detector, if desired. The detector may be used with or without the removable shield 3 depending on the location of the detector, in use, and the desired field of detection. A further removable shield 3 may be added to the detector to provide a rectangular detection pattern, for example where the desired detection field is an aisle. In this case, the rectangular field of detection is defined between the removable shield 3 shown in FIG. 1 and the further removable shield (not shown). The removable shield 3 comprises snap-off sections defined by lines of weakness that can be removed to define other shapes or sizes of the field of detection. The snap-off sections may be circular and/or rectangular, for example.

The detector is of particular application in situations where the detector is a relatively large distance from the detection field. For example, in large warehouses, the height of the warehouse may be well in excess of ten meters. It is desirable to detect the presence of a worker, for example in a particular stock bay, in order to turn on lighting when the worker is present and to turn off the lighting when the worker exits. In this way, it is not necessary for the lighting to be on in every bay of a warehouse all the time and energy is saved. However, where the bay is high and the detector is mounted in the ceiling or roof of the warehouse the distance to the detector from the floor of the warehouse is very large. Consequently, the detection field of the detector covers a relatively large area of the warehouse floor. The configuration of the present detector allows such detection fields to be covered reliably.

Figure 2:
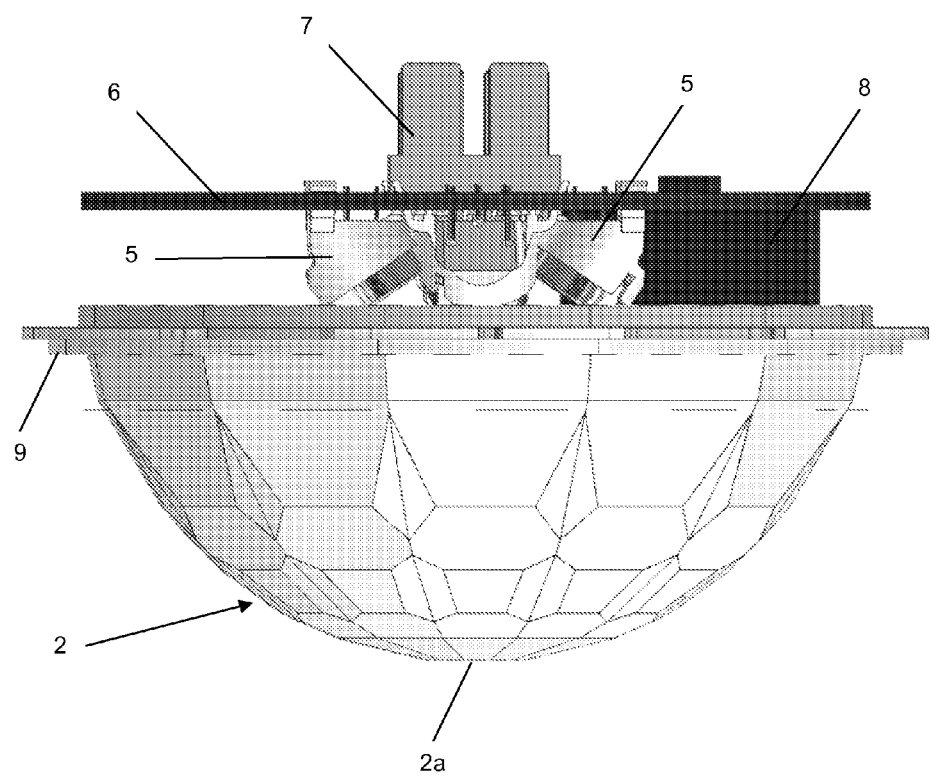
FIG. 2 is a side view of the lens and other components of the detector of FIG. 1 with other components removed.
Figure 3:
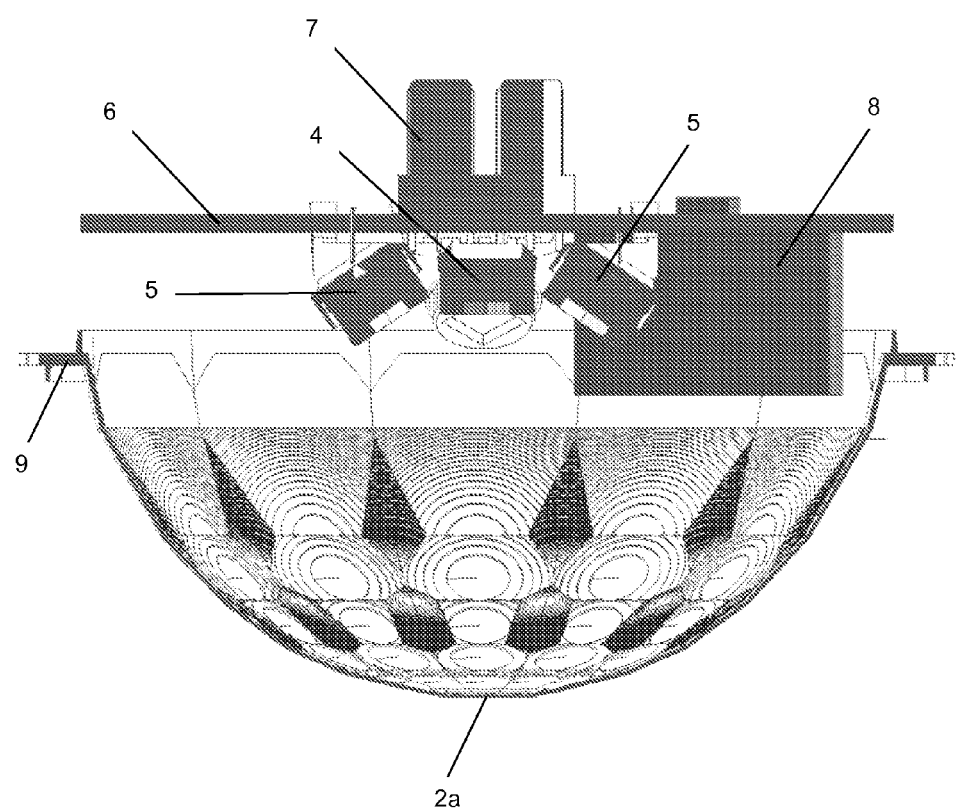
FIG. 3 is a cross-sectional view of the lens and other components of the detector of FIG. 1 with other components removed taken along a central plane of the detector.
Figure 4:
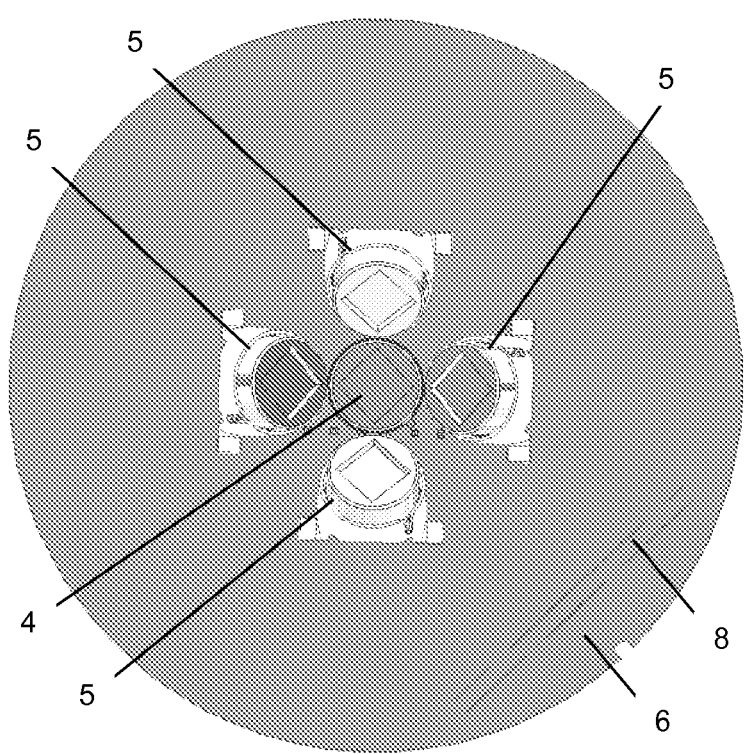
FIG. 4 is a view from below of the arrangement of the PIR sensors of the detector of FIG. 1.
Figure 5:
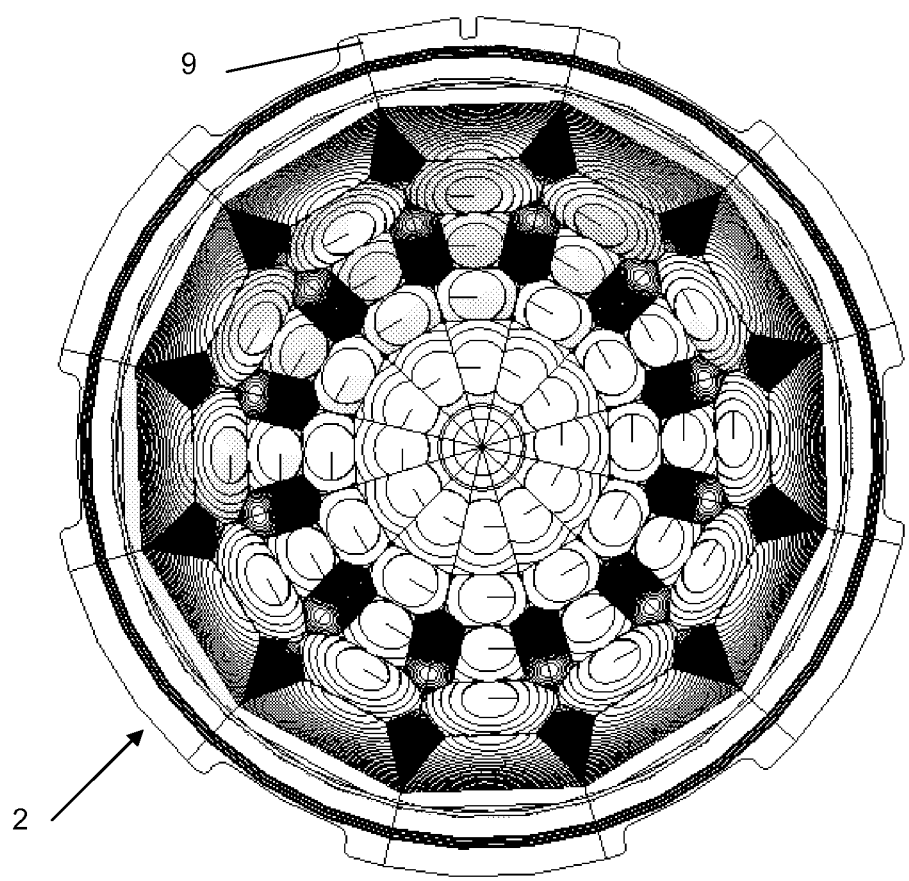
FIG. 5 is a view from above of the internal surface of the lens of the detector of FIG. 1.

FIG. 2 shows the detector of FIG. 1 with the housing 1 and some electrical components removed to more clearly show the configuration of the lens 2. As shown in FIGS. 2, 3 and 4, the detector comprises five passive infra red (PIR) sensors: a central sensor 4 and four peripheral sensors 5. The sensors 4, 5 are mounted to a main circuit board 6, which is provided with a connector 7 for electrical connection to further electrical components (not shown) and a power supply. The main circuit board 6 carries electronic logic for processing signals from the PIR sensors 4, 5. An optional wireless circuit board 8 carries circuitry for wireless control of the detector and can be mounted to the main circuit board 6 as shown in FIG. 2. The central PIR sensor 4 is mounted substantially at the centre of the circular main circuit board 6, which is aligned with the axis of the substantially hemispherical lens 2. The sensitive surface of the central PIR sensor 4 is normal to the axis of the lens such that central sensor 4 is directed outwardly toward the lens 2 in the direction of the axis of the lens 2. The four peripheral PIR sensors 5 are distributed with even spacing about the central sensor 5 and hence about the axis of the lens 2. Each peripheral sensor 5 is tilted towards the axis of the lens 2 relative to the orientation of the central sensor 4. Thus, the outward normal to the sensitive surface of each peripheral sensor 5 makes an acute angle with the outward normal to the sensitive surface of the central sensor 4. In this way, each peripheral sensor 5 is directed towards a portion of the lens 2 that is on the opposite side of the central axis of the lens 2 relative to the position of the respective peripheral sensor 5. With this arrangement, the peripheral sensors 5 are able to detect radiation which is outside of the field of detection of the central sensor 4, without obstructing the field of detection of the central sensor 5. However, most of the field of detection is covered by the central sensor 4, with the peripheral sensors 5 filling the complete field of detection.

The provision of multiple PIR sensors 4, 5 also has the advantage that a positive detection signal can be generated on the condition that more than one sensor 4, 5 registers infra red radiation in order to prevent false positive detection. It may be a condition that that the central PIR sensor 4 is one of the sensors that registers infra red radiation.

Figure 6:
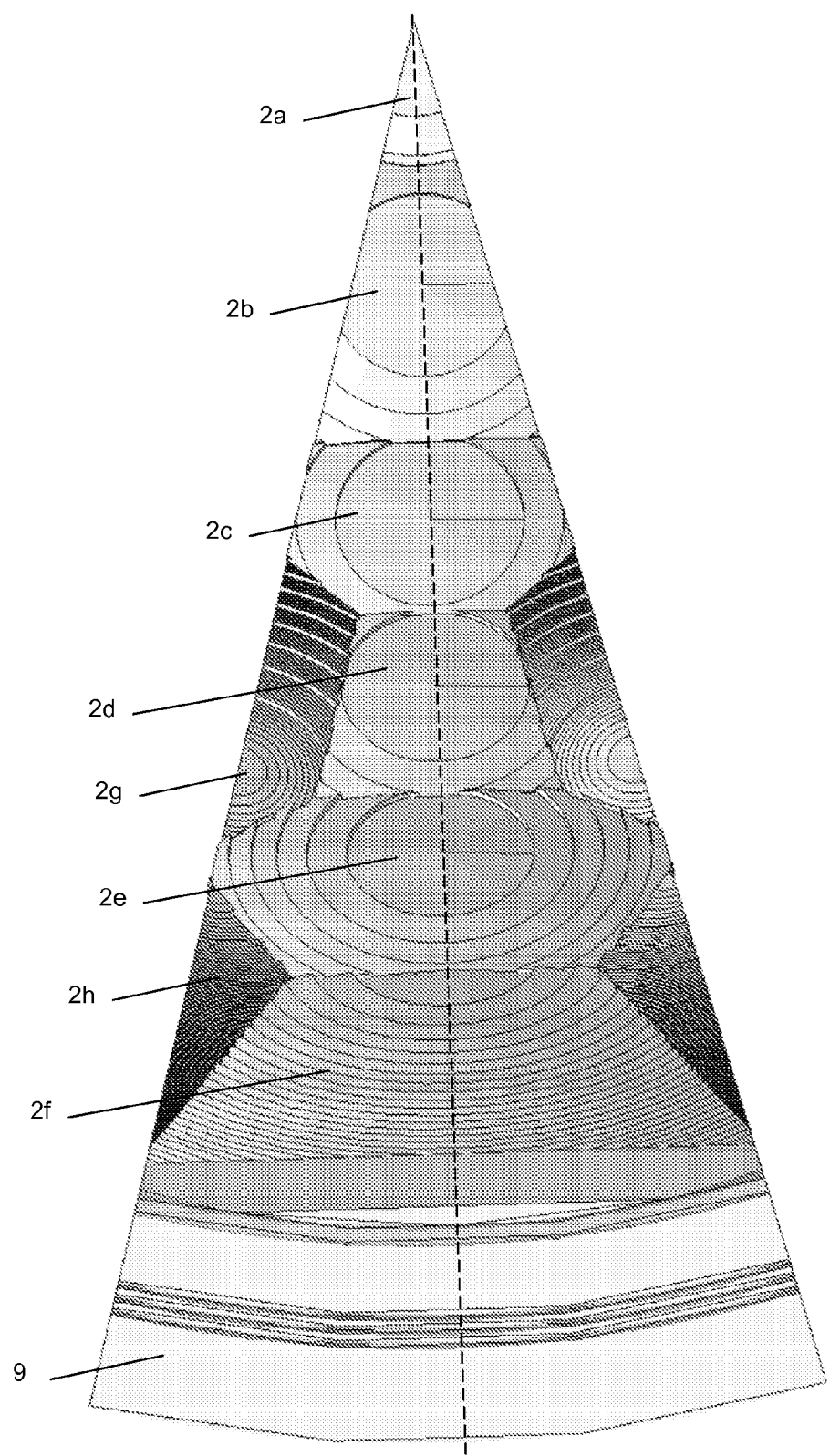
FIG. 6 is a detailed view of a portion of the internal surface of the lens of the detector of FIG. 1.
Figure 7:
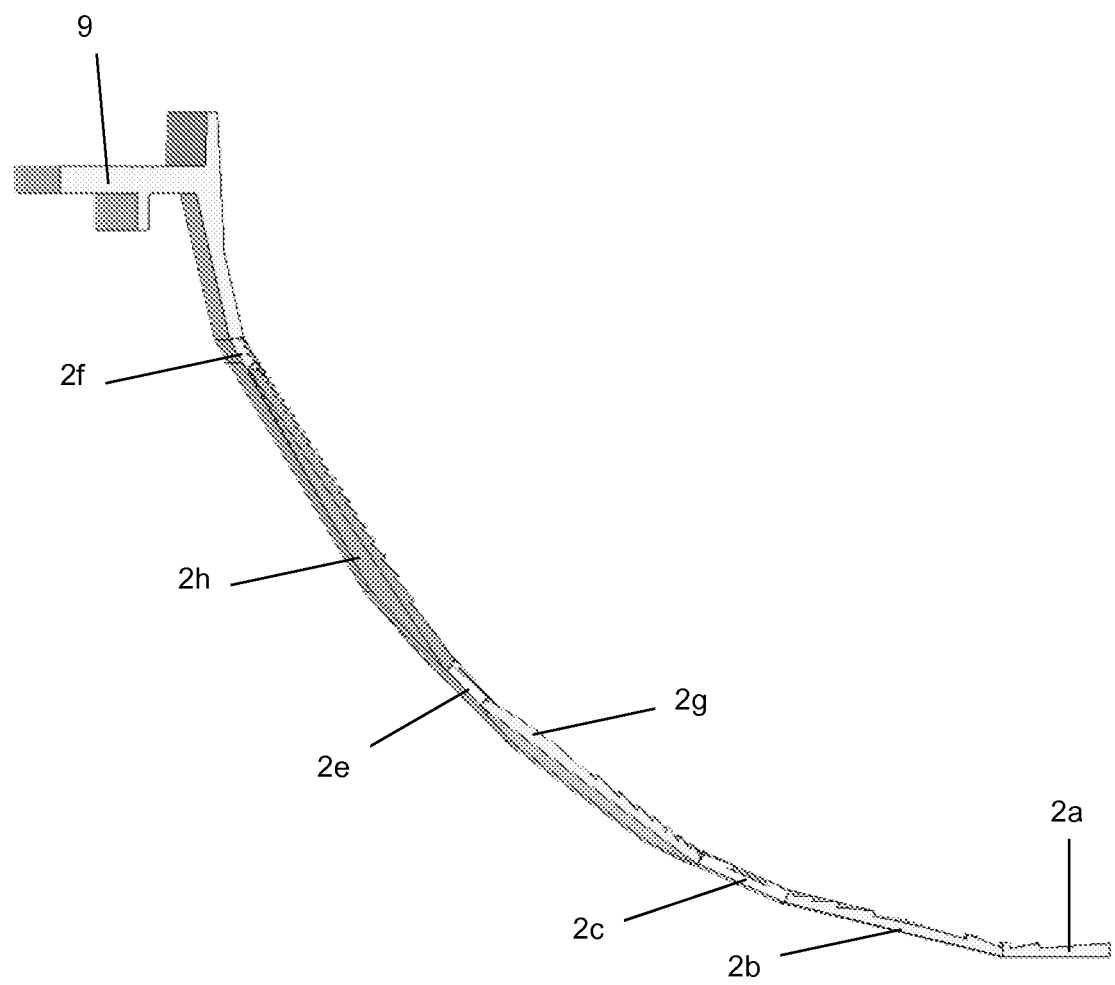
FIG. 7 is a side view along the edge of the portion of FIG. 6.
Figure 8:
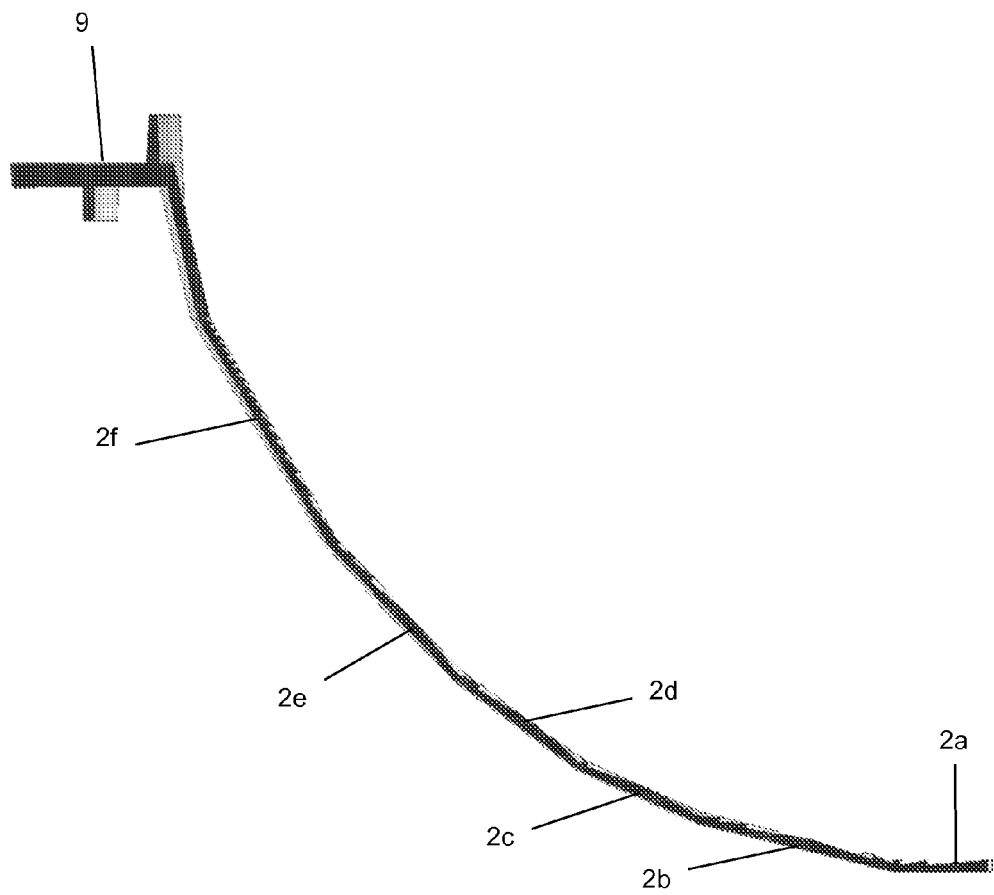
FIG. 8 is a sectional view along the dashed line of FIG. 6.

The lens 2 is a multi-faceted lens having a generally hemispherical form, which forms a dome around the PIR sensors 4, 5. The lens 2 is formed as a single moulding of transparent or translucent plastics. However, the lens can be considered as a composite of a plurality of lenslets forming the complete lens 2. Thus, as shown in FIGS. 2 to 8, the composite lens 2 comprises a central circular lenslet 2a from which extend twelve evenly distributed radial lenslet arrays. One lenslet array is shown in FIG. 6. Each lenslet array comprises five Fresnel lenses in sequence in the radial direction. The first lenslet 2b is based on a substantially optically circular Fresnel lens having a substantially trapezoidal shape to accommodate the adjacent lenslets 2a, 2c. The interface of the first lenslet 2b with the central circular lenslet 2a is curved to match the circumference of the central circular lenslet 2a. The second lenslet 2c is based on a substantially optically circular Fresnel lens having an irregular but symmetrical hexagonal shape to accommodate the adjacent lenslets 2b, 2d, 2g. The third lenslet 2d is based on a substantially optically circular Fresnel lens having a substantially trapezoidal shape to accommodate the adjacent lenslets 2c, 2e, 2g. The fourth lenslet 2e is based on a substantially optically circular Fresnel lens having an irregular but symmetrical hexagonal shape to accommodate the adjacent lenslets 2d, 2f, 2g, 2h. The fifth lenslet 2f is based on a substantially optically circular Fresnel lens having a substantially trapezoidal shape to accommodate the adjacent lenslets 2e, 2h. The fifth lenslet 2f terminates in the radial direction at a skirt portion of the lens 2 which provides an outwardly directed flange 9 for mounting the lens 2 in the housing 1.

Between the lenslets 2c-2f are provided two further intermediate lenslets which span adjacent lenslet arrays. The first intermediate lenslet 2g is located between the second, third and fourth lenslets 2c, 2d, 2e of adjacent lenslet arrays and has an elongate hexagonal shape to accommodate the adjacent lenslets 2c, 2d, 2e. The first intermediate lenslet 2g is based on a substantially optically circular Fresnel lens. The second intermediate lenslet 2h is located between the fourth and fifth lenslets 2e, 2f of adjacent lenslet arrays and has a kite shape to accommodate the adjacent lenslets 2e, 2f. The second intermediate lenslet 2g is based on a substantially optically circular Fresnel lens.

For each of the first, second, third and fourth lenslets 2b, 2c, 2d, 2e the optical centre of the lenslet is located closer to the central circular lens 2a than the geometrical centre of the area occupied by the lenslet. The fifth lenslet 2f has a virtual centre in the sense that the portion of the notional complete circular lens forming the fifth lenslet 2f does not include the centre of the lens. The virtual centre of the fifth lenslet 2f is therefore located outside of the area occupied by the lenslet towards the central circular lenslet 2a. The Fresnel profile of the fifth lenslet 2f differs from a standard circular Fresnel lens in that the lens profile is optimised for on-axis rays in the region of the (virtual) centre and is optimised for off-axis rays as the profile extends away from the central circular lens 2a of the substantially hemispherical lens 2.

The optical centre of the first intermediate lenslet 2g is located further from the central circular lens 2a than the geometrical centre of the area occupied by the lenslet. The second intermediate lenslet 2h also has a virtual optical centre that is located outside of the area occupied by the lenslet towards the central circular lenslet 2a. The Fresnel profile of the second intermediate lenslet 2h differs from a standard circular Fresnel lens in that the lens profile is optimised for on-axis rays in the region of the (virtual) centre and is optimised for off-axis rays as the profile extends away from the central circular lens 2a of the substantially hemispherical lens 2.

The outer surface of each of the lenslets 2a-2h is flat, which aids moulding and lens design. Furthermore, the use of flat facets improves the collection efficiency compared to curved Fresnel lenses of the same area and focal length. The focal length of the lenslets is chosen so that the width of the most distant object to be detected in the typical position of use just fills the sensitive area of the PIR sensor 4, 5. In the present embodiment, each of the lenslets 2a-2h has the same focal length, which corresponds to the radius of the substantially hemispherical lens 2. In the particular embodiment shown, this radius is 35 mm.

With the described arrangement of lenslets 2a-2h forming the substantially hemispherical lens 2, each lenslet 2a-2h has a similar energy collection so that a consistent signal level is produced at the PIR sensors 4, 5 regardless of the position of an object in the field of detection. The energy collection for each lenslet 2a-2h is determined by its area and the angle at which radiation is incident on the lens and the PIR sensor 4, 5. The position of the centre of each lenslet 2a-2h on the hemisphere is determined by reference to the desired pattern of detection centres in the field of detection, to give the required minimum detectable distance of movement of an object and bearing in mind the collection efficiency of the lenslets 2a-2h. The required pattern of detection centres also determines the required number lenslets. In the described arrangement, the lenslets are located and orientated to direct radiation from a respective detection centre onto the PIR sensors 4, 5.

Thus, with the detector according to the described embodiment, infra red radiation from persons in a wide field of detection can be detected even when the detector is located at a significant height above the floor.

In summary, a passive infra red detector comprises a plurality of passive infra red sensors 4, 5 and a lens member 2 arranged to direct radiation from a target area onto the sensors. The lens member 2 forms a substantially hemispherical dome about the infra red sensors 4, 5. The dome has a central axis and a plurality of contiguous facets 2a-2g distributed about the central axis. Each facet has a flat outer surface and an inner surface that forms a lens to direct radiation onto the sensors. The detector further comprises a first passive infra red sensor 4 aligned with the central axis of the dome and having a sensitive surface substantially normal to the central axis, and a plurality of second passive infra red sensors 5 distributed about the central axis of the dome. The second passive infra red sensors 5 are inclined such that the outward normal from the sensitive surface of each second passive infra red sensor 5 makes an acute angle with the outward direction of the central axis. The detector is capable of detecting movement of people within a wide region from a significant height above that region.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A passive infra red detector comprising a plurality of passive infra red sensors and a lens member arranged to direct radiation from a target area onto the sensors,
wherein the lens member forms a substantially hemispherical dome about the infrared sensors, the dome having a central axis and comprising a plurality of contiguous facets distributed about the central axis, each facet having an outer surface and an inner surface that forms a lens to direct radiation onto the sensors,
wherein the plurality of contiguous facets comprises a plurality of lenslets distributed about the central axis,
wherein the detector comprises a first passive infra red sensor aligned with the central axis of the dome and having a sensitive surface substantially normal to the central axis, and a plurality of second passive infra red sensors distributed about the central axis of the dome,
wherein the second passive infra red sensors are inclined such that the outward normal from the sensitive surface of each second passive infra red sensor makes an acute angle with the outward direction of the central axis, and
wherein an optical centre of each lenslet is located closer, along the surface of the dome, to the central axis than a geometrical centre of the lenslet.

2. A passive infra red detector as claimed in claim 1, wherein the detector is configured to generate a positive detection signal only when infra red radiation is detected by more than one of the passive infra red sensors.

3. A passive infra red detector as claimed in claim 1, wherein said dome is formed exclusively from said plurality of contiguous facets.

4. A passive infra red detector as claimed in claim 1, wherein the plurality of contiguous facets comprises a plurality of arrays of facets distributed about the central axis, each array comprising a series of contiguous facets extending from the central axis to the base of the dome.

5. A passive infra red detector as claimed in claim 4, wherein the dome comprises at least twelve of said arrays.

6. A passive infra red detector as claimed in claim 4, wherein within each array the optical centres of the lenses are aligned at the same azimuthal position about the central axis.

7. A passive infra red detector as claimed in claim 4, wherein each array comprises at least five facets.

8. A passive infra red detector as claimed in claim 4, wherein the first facets of each array form a substantially circular lens about the central axis.

9. A passive infra red detector as claimed in claim 1, wherein the lenses are Fresnel lenses.

10. A passive infra red detector as claimed in claim 9, wherein at least one of the lenses has a Fresnel profile having a first region that optimises energy collection of on axis rays and a second region that optimises energy collection of off-axis rays.

11. A passive infra red detector as claimed in claim 1, wherein each facet has a flat outer surface.

12. A passive infra red detector as claimed in claim 11, wherein the detector is configured to generate a positive detection signal only when infra red radiation is detected by more than one of the passive infra red sensors.

13. A passive infra red detector as claimed in claim 11, wherein said dome is formed exclusively from said plurality of contiguous facets.

14. A passive infra red detector as claimed in claim 11, wherein the plurality of contiguous facets comprises a plurality of arrays of facets distributed about the central axis, each array comprising a series of contiguous facets extending from the central axis to the base of the dome.

15. A passive infra red detector as claimed in claim 14, wherein the dome comprises at least twelve of said arrays.

16. A passive infra red detector as claimed in claim 14, wherein within each array the optical centres of the lenses are aligned at the same azimuthal position about the central axis.

17. A passive infra red detector as claimed in claim 14, wherein each array comprises at least five facets.

18. A passive infra red detector as claimed in claim 14, wherein the first facets of each array form a substantially circular lens about the central axis.

19. A passive infra red detector as claimed in claim 1, wherein the second passive infra red sensors are each inclined such that the outward normal from the sensitive surface passes through different respective facets of the dome.

20. A passive infra red detector as claimed in claim 1, wherein the relative areas of the facets are configured such that each lens collects substantially the same energy from a remote planar radiation source normal to the central axis.

* * * * *